July 8, 1952            J. C. BARNABY            2,602,434
HYDRAULIC VALVE OPERATING MECHANISM OPERABLE
TO VARY VALVE LIFT AND VALVE TIMING
Filed March 29, 1947            2 SHEETS—SHEET 1

JAMES C. BARNABY
INVENTOR.

BY *[signature]*
*Attorney*

Patented July 8, 1952

2,602,434

UNITED STATES PATENT OFFICE 2,602,434

HYDRAULIC VALVE OPERATING MECHANISM OPERABLE TO VARY VALVE LIFT AND VALVE TIMING

James C. Barnaby, Short Hills, N. J., assignor to Worthington Pump and Machinery Corporation, Harrison, N. J., a corporation of Delaware Application March 29, 1947, Serial No. 738,188

4 Claims. (Cl. 123—90)

This invention relates to a hydraulic valve operating mechanism operable to vary valve lift and valve timing.

An object of the present invention is to provide a hydraulically operated mechanism especially suitable for such service as the operation of a valve in a diesel engine requiring accurate timing and lift. More specifically the present invention comprises an operating plunger which serves to operate or move the stem of a valve of a diesel engine or the like, which valve operating plunger is, in turn, actuated by pressure of a liquid delivered by a suitable pump and wherein the pump will always deliver the same amount of fluid per stroke and the stroke of the valve operating plunger will always be constant for any given adjustment thereof. The present invention also comprehends the provision of means to compensate for any leakage in the system of the apparatus so as to prevent interference in the accuracy of operation of the valve.

Other objects of the present invention are: the provision of means whereby the time of the beginning of the stroke or movement of the valve operating plunger and the mechanism operated thereby may be varied and controlled without changing the length of the stroke of the operating plunger; means whereby the stroke or length of movement of the operating plunger may be varied and controlled without changing the time of the beginning of its movement, and a hydraulic valve operating mechanism as above referred to wherein any combination of time of the beginning of movement or stroke of the operating plunger and the stroke or length of movement of the plunger may be accomplished independently of each other.

With these and other objects in view, as may appear from the accompanying specification, the invention consists of various features of construction and combination of parts, which will be first described in connection with the accompanying drawings, showing a hydraulic valve operating mechanism of a preferred form embodying the invention, and the features forming the invention will be specifically pointed out in the claims.

Figure 1:
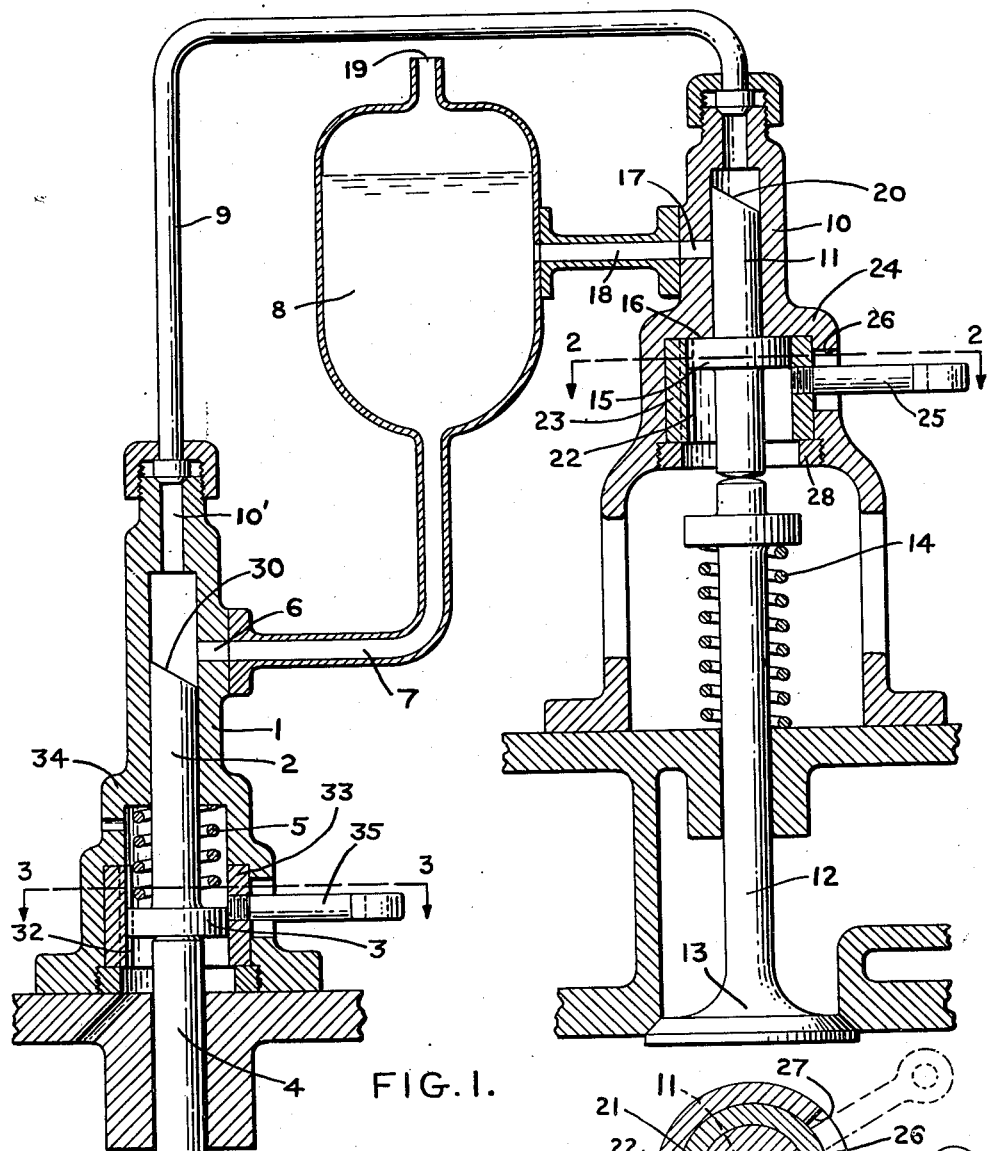
Figure 1 is a diagrammatic view partly in section of the improved hydraulic valve operating mechanism.

Referring more particularly to the drawings, the improved hydraulically operated valve operating mechanism includes a pump cylinder 1 in which a pumping plunger 2 is reciprocated by means of a cam 3′ and a push rod 4. The enlarged head 3 of the pump plunger 2 is engaged by a spring 5 which moves the plunger 2 to its lowermost position wherein the liquid inlet port 6 to the pump cylinder 1 is uncovered. The liquid inlet port 6 is connected by a conduit 7 to the bottom of a liquid reservoir 8. The liquid reservoir 8 is preferably located above the cylinder 1 so that when the pump plunger 2 is moved towards its lower position sufficiently to uncover the inlet port 6 fluid will fill the cylinder 1 above the pump plunger 2.

The pump cylinder 1 has a discharge conduit 9 connected to the upper discharge port 10′ of the pump cylinder and the conduit 9 serves to discharge liquid under pressure from the pump cylinder 1 after the pump plunger has moved upwardly sufficiently to close the inlet 6, into the cylinder 10 of the valve operating structure. The operating cylinder 10 has a plunger 11 mounted therein which is forced downwardly by the pressure fluid entering the operating cylinder 10 and in its downward movement it will move the valve stem 12 and the valve 13 off its seat to open the valve. A spring 14 serves to hold the valve stem against the end of the operating plunger 11 and this spring also exerts a pressure to force the operating plunger 11 upwardly in the operating cylinder 10 until such upward movement of the plunger is arrested by engagement of the stop collar 15 thereon against the stop shoulder 16 formed on the cylinder 10.

The operating cylinder 10 which contains the valve actuating plunger 11 has a discharge port 17 therein located a predetermined distance above the stop shoulder 16 and this discharge port is uncovered as the operating plunger moves outwardly or downwardly to permit the discharge of the operating pressure fluid from the cylinder 10, relieving the plunger of the pressure of the operating fluid and limiting the stroke of the plunger and the valve lift. The outlet port 17 is connected by a conduit 18 to the reservoir 8 so that all liquid delivered by the pump plunger 2 in excess of the displacement of the operating plunger 11 may return to the reservoir 8 for reuse and since the reservoir is open through the conduit 7 to the inlet 6 of the pump cylinder 1 the pressure liquid discharging from the operation cylinder 10 is, in effect, returned to the pump cylinder 1. The reservoir 8 is provided with a vent opening 19 to permit the escape of air or gases therefrom, and by utilizing a reservoir of sufficient size need for cooling the circulating liquid is eliminated, however, if it is desired or necessary, any approved type of cooling means (not shown) may be employed for cooling the liquid.

The stop collar 15 and the shoulder 16 are so located that the clearance between the valve stem 12 and the operating plunger 11 is the minimum practical when the valve 13 is on its seat.

In operation, when the pump plunger 2 moves inwardly or upwardly in the pump cylinder 1 under action of the cam 3 and the push rod 4 liquid will discharge through the inlet port 6 back into the reservoir 8 and some liquid will also be discharged into the conduit 9, and no pressure will be built up in the pump cylinder 1 until the pump plunger 2 has moved sufficiently to close the inlet port 6. After the inner or upper end of the pump plunger 2 has closed the inlet port 6 further movement of the pump plunger will force the liquid in the pump cylinder 1 from the cylinder through the conduit 9 into the operating cylinder 10 and move the valve operating plunger 11, which is otherwise held in its uppermost or innermost position by the valve stem 12 and spring 14. As the operating plunger 11 moves outwardly or downwardly under pressure of the liquid forced into the cylinder 10 of the pump plunger 2, it will move the valve 13 until the operating plunger 11 uncovers the discharge port 17 at which time pressure of the liquid in the cylinder 10 is released and any further liquid delivered by the pump plunger 2 will flow through the cylinder 10 and conduit 18 into the reservoir 8 and there is, consequently, no further movement or travel of the operating plunger 11 and thus the valve lift or the opening movement of the valve will be constant regardless of the quantity of liquid delivered by the pump plunger 2. The pump cylinder 1 and the pump plunger 2 are so constructed and proportioned that a surplus quantity of liquid under pressure will be delivered to the operating cylinder 10 so as to compensate for any leakage of liquid in the system and will insure constant stroke or length of movement of the operating plunger at all times. When the pump plunger 2 reaches the end of its outward or upward travel, the operating plunger 11 will remain substantially stationary in the position with its inner end at the discharge port 17 until the pump plunger 2 begins its return stroke under action of spring 5, when the pump plunger 2 is relieved of the outward forcing movement of the cam 3 and push rod 4. As the pump plunger 2 recedes the valve operating plunger 11 will move inwardly or upwardly under action of the spring 14, towards its inner position, displacing fluid or liquid backward through the conduit 9 into the pump cylinder 1 until the stop collar 15 engages the stop shoulder 16.

By locating the inlet port 6 to the pump cylinder 1 so that the displacement volume of the plunger 2 above the inlet port 6 is greater than the displacement of the plunger 11 in the operating cylinder 10 during its stroke from its inward or stop position to the position at which it opens the port 17, the valve operating plunger 11 will always make its full stroke, but no more, because the extra volume of liquid delivered by the pump plunger 2 will be discharged through the discharge port 17 and conduit 18 back into the reservoir 8. If there is any leakage in the pressure side of the system between the pump plunger 2 and the operating plunger 11 it will not affect the stroke or operation of the valve operating plunger 11 unless the leakage is greater than the difference in the displacement of the pump plunger 2 between the port 6 and its extreme travel and the operating plunger 11 and its inward travel to the position which will open the port 17.

In some installations it may be desired to vary the lift or opening of the valve 13 and to provide such variance the inner or upper end of the operating plunger 11 is cut at an incline or in a plane at an angle to the axis of the plunger as is shown at 20 in Figure 1 of the drawings. The plunger 11 is rotatable in the operating cylinder 10 and the stop collar 15 has a keyway or groove 21 cut therein which receives the feather or key 22. The feather or key 22 is carried by a rotatable ring 23 rotatable in the enlarged lower end 24 of the cylinder 10. An operating handle 25 is attached to the rotating ring or sleeve 23 and extends outwardly through a suitable opening 26 formed in the enlarged extension 24 of the cylinder 10 and thus by moving the handle 25 the plunger 11 may be rotated so that the distance the operating plunger 11 moves outward before it uncovers the port 17 is shorter or longer as desired. The lever 25 is limited in its scope of movement by the ends 27 of the opening 26. The ring 23 is held in position by a removable screw ring 28 and the ring 23 is of sufficient width so that the feather 22 will remain in the slot or keyway 21 during the entire stroke of the plunger 11. The slant or angular degree of the inclined end 20 of the plunger 11 may be made such as to give any desired relation between the rate of axial motion to the rate of angular movement. With the arrangement as shown, the time when the lift or movement of the valve 13 begins is constant in spite of variation of the timing when the motion of the valve ends or variation of the time when the port 17 is opened to discharge.

For the purpose of varying the time when the lift or opening of the valve 13 begins, the pump plunger 2 has its inner or upper end inclined or cut at an acute angle to the plane of the axis of the plunger as shown at 30 and this plunger 2 is rotatably mounted in the pump cylinder 1 and has a groove or keyway 31 cut in the perimeter of its head 3. The groove or keyway 31 receives therein a feather 32 carried by a sleeve or collar 33. The sleeve or collar 33 is rotatably carried in the lower enlarged end 34 of the pump cylinder 1 and it has an operating arm 35 connected thereto. The operating arm 35 extends through an opening 36 in the enlarged end 34 of the pump cylinder 1 and by movement of this lever 35 the sleeve or collar 33 may be rotated to rotate the plunger 2 to vary the time at which the inlet opening 6 is opened and closed during reciprocation of the plunger 2. The slant or degree of the angle of incline of the end 30 of the plunger 2 may be made such, as to give any desired relation between the rate of axial motion to the rate of angular motion.

From the foregoing it would be apparent that the time of the beginning of the movement of the valve operating plunger 11 and the valve stem 12 and valve 13 may be varied and controlled without changing the length of the movement or stroke of the plunger 11, as its stroke is controlled by the opening of the port 17 by the inclined top of the operating plunger 11.

It will also be apparent that the amount of movement or the length of the stroke of the operating plunger 11 may be varied and controlled without changing the time of the beginning of its movement and also that any combination of the time of the beginning of the movement of the operating plunger 11 and the amount of its movement or length of its scope may be accomplished independently of each other.

Figure 2:
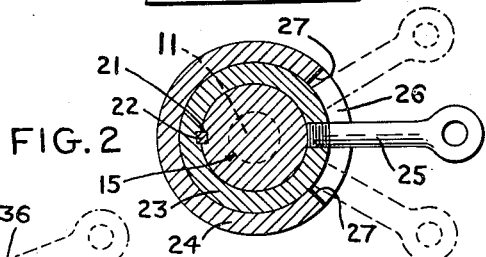
Figure 2 is a cross section taken on the line 2—2 of Figure 1.
Figure 3:
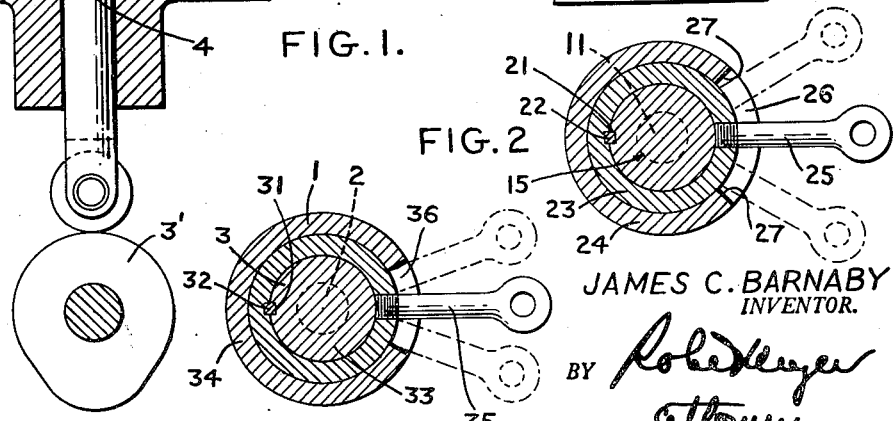
Figure 3 is a cross section taken on the line 3—3 of Figure 1.
Figure 4:
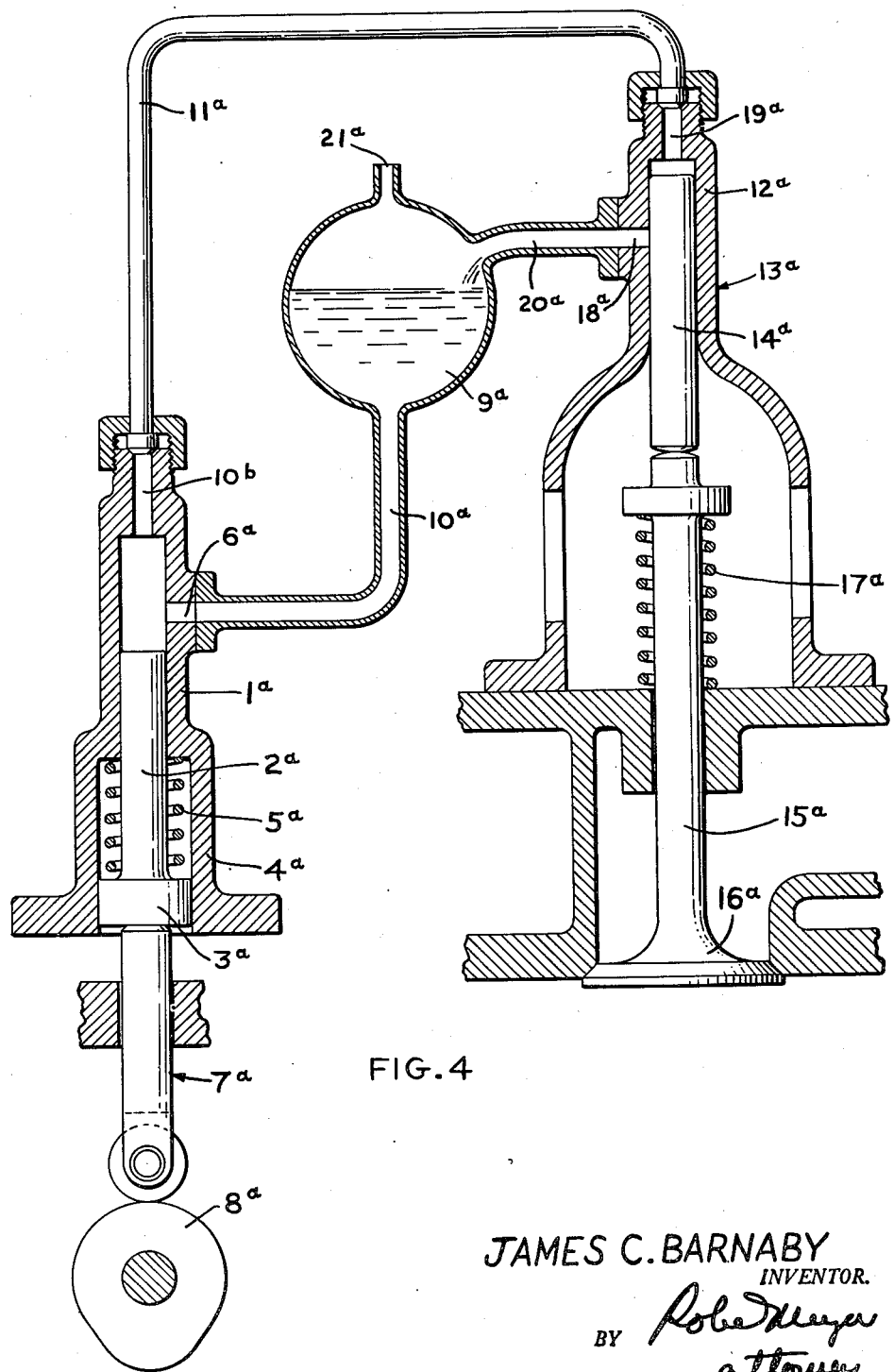
Figure 4 is a diagrammatic view partly in section of a modified form of the improved hydraulic valve operating mechanism.

Figure 4 of the drawings shows a modified form of the invention which differs from the form shown in Figures 1 to 3 of the drawings primarily in the fact that the modified form of the invention does not provide adjustable means for varying and controlling the time of the beginning of movement of the operating plunger or adjustable means for varying and controlling the length of the stroke of the operating plunger.

The modified form of the invention includes a pumping cylinder 1ª in which is mounted a pumping plunger 2ª having an enlarged head 3ª on its lower end. The head 3ª reciprocates in the enlarged end 4ª of the pump cylinder 1ª and is engaged by a spring 5ª which is tensioned to move the pump plunger 2ª to its lowermost position and hold the head 3ª in contact with the operating rod 7ª. The operating rod 7ª is moved by a cam 8ª, upon rotation of the cam 8ª to move the plunger 2ª upwardly in the cylinder 1ª.

The pumping cylinder 1ª has its inlet 6ª connected to a reservoir 9ª through a conduit 10ª and it has its discharge port 10ᵇ connected through a conduit 11ª with the inlet port 19ª of the operating cylinder 12ª of the valve operating mechanism 13ª. An operating plunger 14ª reciprocates in the operating cylinder 12ª and its lower or outer end engages the valve stem 15ª of the valve 16ª for moving the valve 16ª into open position upon downward or outward movement of the plunger 14ª.

A spring 17ª moves the valve 16ª to closed position and moves the plunger 14ª to its upward or inner position upon relief of pressure of pressure fluid against the plunger 14ª.

The discharge port 18ª of the operating cylinder 12ª communicates with the reservoir 9ª through a conduit 20ª.

The proportioning and relative movements of the parts of this modified form of the invention are such that it operates in exactly the same manner and performs the same functions as the form of the invention shown in Figures 1 to 3 of the drawings, excepting only that it does not embody the adjustable features as referred to in the first paragraph hereof which refers to this modified form of the invention.

It will be understood that the invention is not to be limited to the specific construction or arrangement of parts shown, but that they may be widely modified within the invention defined by the claims.

What is claimed is:

1. In a hydraulic valve operating mechanism, a fluid reservoir, an operating cylinder having an inlet and a discharge port in spaced relation to said inlet communicating with said reservoir, an operating plunger slidable in said operating cylinder normally maintaining said discharge port closed, an inclined end portion on said operating plunger, means for rotatably adjusting said operating plunger to vary the time of opening of said discharge port by the inclined end portion of the operating plunger for regulating the stroke of said operating plunger, a pump structure including a pump cylinder and a pump plunger slidable therein, said pump cylinder having a discharge outlet for discharging operating pressure fluid to said inlet for the operating cylinder and an inlet port communicating with said fluid reservoir to allow fluid to flow to said cylinder, and means for intermittently operating said pump plunger, and said pump cylinder so constructed and proportioned that the quantity of fluid discharged by the pump on each operation will be greater than the capacity of said operating cylinder above the discharge port thereof.

2. In a hydraulic valve operating mechanism, a fluid reservoir, a pump structure including a pump cylinder, a pump plunger slidable in said cylinder, and means for intermittently operating said pump plunger, said pump cylinder having an inlet port communicating with said fluid reservoir and a discharge outlet, an operating cylinder having an inlet connected to said discharge outlet, a discharge port on said operating cylinder in spaced relation to said inlet communicating with said fluid reservoir and so constructed and arranged with respect to said inlet that the quantity of fluid discharge from said pump structure is greater than the capacity of said operating cylinder between the inlet and the discharge port, an operating plunger slidably mounted in said operating cylinder, an inclined end on said operating plunger, resilient means for normally forcing said operating plunger inwardly of said cylinder, a stop means on said operating plunger for limiting the inward movement, and means for rotatably adjusting said operating plunger to vary the time of opening of said discharge port by said inclined end of the operating plunger for limiting the outward movement of said operating plunger during operation of the pump structure.

3. In a hydraulic valve operating mechanism, a fluid reservoir, an operating cylinder having an inlet and a discharge port in spaced relation to said inlet communicating with said reservoir, an operating plunger slidable in said operating cylinder normally maintaining said discharge port closed, an inclined end portion on said operating plunger, means for rotatably adjusting said operating plunger to vary the time of opening of said discharge port by the inclined end portion of the operating plunger for regulating the stroke of said operating plunger, a pump structure including a pump cylinder and a pump plunger slidable therein, said pump cylinder having a discharge outlet for discharging operating pressure fluid to said inlet for the operating cylinder and an inlet port communicating with said fluid reservoir, an inclined fluid displacing end on said pump plunger, means for rotatably adjusting said pump plunger to vary the time of closing of said inlet port by the inclined fluid displacing end of the pump plunger for regulating the beginning of movement of said operating plunger, and means for intermittently operating said pump plunger, and said pump cylinder so constructed and proportioned that the quantity of fluid discharged by the pump on each operation will be greater than the capacity of said operating cylinder above the discharge port thereof.

4. In a hydraulic valve operating mechanism, a fluid reservoir, a pump structure including a pump cylinder having an inlet port communicating with said fluid reservoir, a pump plunger slidably mounted in said pump cylinder means for intermittently reciprocating said pump plunger in said cylinder and a discharge outlet for said pump cylinder, an inclined fluid displacing end on said pump plunger, means for rotatably adjusting said pump plunger to vary the time of closing of said inlet port by the inclined fluid displacing end of said pump plunger, an operating cylinder having an inlet connected to said discharge outlet, a discharge port for said operating cylinder in spaced relation to said inlet communicating with said fluid reservoir and so constructed and arranged with respect to said inlet that the quantity of fluid discharged from said pump structure is greater than the capacity of said operating cylinder between said inlet and said discharge port, an operating plunger slidable in said operating cylinder, an inclined end of said operating plunger, means for rotatably adjusting said operating plunger to vary the time of opening of said discharge port by said inclined end of the operating plunger for limiting the outward movement of said operating plunger during operation of the pump structure, resilient means for normally urging said operating plunger inwardly of said operating cylinder, and a stop member about the operating plunger to limit the inward movement of said operating plunger.

JAMES C. BARNABY.

REFERENCES CITED

The following references are of record in the file of this patent:

UNITED STATES PATENTS

| Number | Name | Date |
| --- | --- | --- |
| 1,623,177 | Funderburk | Apr. 5, 1927 |
| 1,883,980 | Lang | Oct. 25, 1932 |
| 1,994,223 | Leveque | Mar. 12, 1935 |
| 2,011,864 | Lundh | Aug. 20, 1935 |
| 2,326,883 | Pierce et al. | Aug. 17, 1943 |
| 2,396,392 | Schreck | Mar. 12, 1946 |

FOREIGN PATENTS

| Number | Country | Date |
| --- | --- | --- |
| 12,523 | Great Britain | May 21, 1914 |
| 739,000 | France | Oct. 24, 1932 |
| 748,426 | France | Apr. 18, 1933 |